United States Patent [19]

Chiba et al.

[11] Patent Number: 4,923,925
[45] Date of Patent: May 8, 1990

[54] RESIN COMPOSITIONS AND THEIR MANUFACTURING METHOD

[75] Inventors: Kazumasa Chiba; Kazuhiko Kobayashi; Osamu Ueno, all of Nagoya, Japan

[73] Assignee: Toray Industries, Inc.

[21] Appl. No.: 91,708

[22] Filed: Sep. 1, 1987

[30] Foreign Application Priority Data

Sep. 2, 1986 [JP] Japan .................................. 61-206453
Sep. 11, 1986 [JP] Japan .................................. 61-214614

[51] Int. Cl.$^5$ .............................................. C08L 77/00
[52] U.S. Cl. ..................................... 525/66; 525/178; 525/181; 525/182; 525/183
[58] Field of Search ................... 525/187, 182, 66, 178, 525/183

[56] References Cited

U.S. PATENT DOCUMENTS 4,612,346  9/1986  Chiba et al. .......................... 525/182

FOREIGN PATENT DOCUMENTS 2722270 12/1977 Fed. Rep. of Germany ...... 525/181
0206667 12/1983 Japan .................................. 525/181
0207951 11/1984 Japan .................................. 525/181
0049018  3/1985 Japan .................................. 525/181

*Primary Examiner*—Ana L. Carrillo
*Attorney, Agent, or Firm*—Austin R. Miller

[57] ABSTRACT

Resin compositions of (A) 50–95 percent by weight of a polyamide and (B) 5–50 percent by weight of a modified polyolefin containing in side chains 0.005–5 molar percent of functional groups expressed by formulas (I) and/or (II) below and 0.005–5 molar percent of functional groups expressed by formulas (III) and/or (IV) below provide molds having a high impact resistance and are applicable to automobile parts.

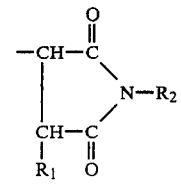

(I)

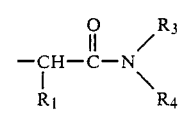

(II)

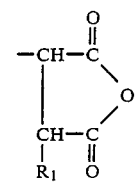

(III)

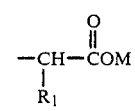

(IV)

Where $R_1$ represents hydrogen or methl and wherein $R_2$, $R_3$ and $R_4$ represent hydrogen, aliphatic, alicyclic or aromatic residual groups having 1–30 carbon atoms.

8 Claims, No Drawings

RESIN COMPOSITIONS AND THEIR MANUFACTURING METHOD

BACKGROUND OF THE INVENTION

1. Field of the Invention

This invention relates to polyamide resin composition having distinguished impact resistance, moldability and manufacturing stability and their manufacturing method.

2. Description of the Prior Art

Recently, for the purpose of improving the impact resistance of polyamides, resin compositions having various polyolefins incorporated have been investigated. In order for the impact resistance to be improved, it is required that the polyamide and polyolefin present a tightly combined state, and for such purpose, technologies of modifying polyolefin have been proposed. As a typical example of the polyamide and modified polyolefin compositions and their manufacturing methods heretofore known, a method of preparing a modified polyolefin having carboxyl or acid anhydride groups and melt compounding it with a polyamide as described in U.S. Pat. No. 4,174,358 or a method of preparing a modified polyolefin having imide or amide groups and melt compounding it with a polyamide as described in U.S. Pat. No. 4,612,346, may be cited.

However, it was known that the resin compositions shown in U.S. Pat. No. 4,174,358 had difficulties in flow at the time of injection molding and in the surface appearance of the molded articles. The resin compositions shown in U.S. Pat. No. 4,612,346 were found to have a problem that they were of poor stability in manufacturing, that is, the gut emitted from the extruder was of poor spinnability, resulting in frequent cutting of the gut. Also, in these prior disclosures, a method of preparing a modified polyolefin having various functional groups and melt compounding it with a polyamide is disclosed, and it is noted as one of the requisites that as the polyamide and modified polyolefin have to be finely admixed with each other, the modified polyolefin should not be cross-linked substantially.

BRIEF SUMMARY OF THE INVENTION

An object of the present invention is to provide resin compositions comprised of a polyamide and a polyolefin and distinguished in impact resistance, flow in injection molding and stability in manufacturing.

Another object of the present invention is to provide a novel and efficient manufacturing method of resin compositions consisting of a polyamide and a polyolefin.

Still another object of the present invention is to provide resin compositions having a specially designated modified polyolefin incorporated for the polyamide in order to satisfy all of the requirements for impact resistance, molding flow and manufacturing stability.

A further object of the present invention is to provide resin compositions containing a polyamide and a polyolefin having specific kinds and quantities of functional groups in the side chains.

A still further object of the present invention is to provide resin compositions containing a polyamide and a modified polyolefin having both functional groups of imide and/or amide groups expressed by formulas (I) and/or (II) described later and acid anhydride and/or carboxyl groups expressed by formulas (III) and/or (IV) also described later.

A still further object of the present invention is to provide a method of stably manufacturing resin compositions distinguished in impact resistance and molding flow by melt compounding of a polyamide and a polyolefin, in the presence of an $\alpha,\beta$-unsaturated imide compound and/or an $\alpha,\beta$-unsaturated amide compound and an $\alpha,\beta$-unsaturated carboxylic acid compound and/or an $\alpha,\beta$-unsaturated carboxylic acid anhydride and an organic peroxide.

A still further object of the present invention is to provide a manufacturing method of resin compounds in which modification of polyolefin and compounding of polyolefin and polyamide are carried out simultaneously using at least two kinds of compounds as modifiers of polyolefin.

A still further object of the present invention is to provide resin compositions and manufacturing method having a modified polyolefin partially cross-linked and dispersed in a polyamide or, more particularly, having the modification and cross-linking of the polyolefin proceed concurrently during the process of compounding so that the polyolefin is finely dispersed in the polyamide to form a fine morphology.

To achieve the objects of the present invention, the resin compositions of the invention are comprised of (A) 50–95 percent by weight, preferably 55–93 percent by weight or more preferably 60–90 percent by weight of a polyamide and (B) 5–50 percent by weight, preferably 7–45 percent by weight or more preferably 10–40 percent by weight of a modified polyolefin containing in the side chains 0.005–5 mol percent, preferably 0.01–4.5 mol percent or more preferably 0.02–4 mol percent of a functional group or groups expressed by the following formulas (I) and/or (II) and 0.005–5 mol percent, preferably 0.008–4 mol percent or more preferably 0.01–3 mol percent of a functional group or groups expressed by the formulas (III) and/or (IV).

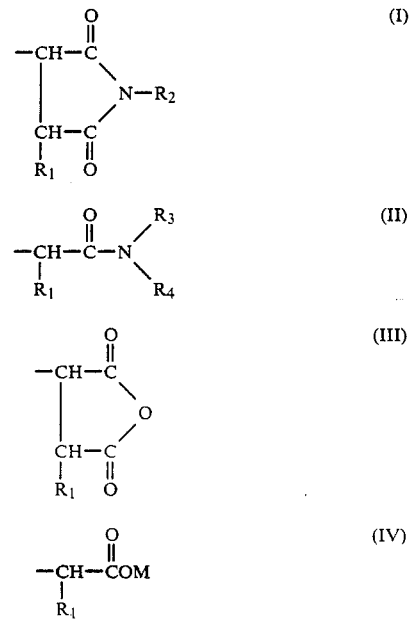

Here, $R_1$ represents a hydrogen atom or methyl group, and $R_2$, $R_3$ and $R_4$ represent respectively a hydrogen atom or aliphatic, alicyclic or aromatic residue having 1-30 carbon atoms, preferably $R_2$ being a functional group chosen from alkyl having 1-10 carbon atoms, phenyl, cyclohexyl and benzyl groups and $R_3$ and $R_4$ being respectively a hydrogen atom or an alkyl group having 1-10 carbon atoms, and M represents a hydrogen atom or a metallic ion of a valence of 1-3.

DESCRIPTION OF THE PREFERRED EMBODIMENTS

Polyamides used in the present invention are polymers having an amide bond, and the components may be chosen from amino acids such as 6-aminocaproic acid, 11-aminoundecanoic acid, 12-aminododecanoic acid, para-aminomethylbenzoic acid, lactams such as ε-caprolactam and ω-laurolactam, diamines such as tetramethylenediamine, hexamethylenediamine, undecamethylenediamine, dodecamethylenediamine, 2,2,4-/2,4,4-trimethylhexamethylenediamine, 5-methylnonamethylenediamine metaxylylenediamine, paraxylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(aminocyclohexyl)propane, bis(aminopropyl)piperazine and aminoethyl piperazine, and dicarboxylic acids such as adipic acid, suberic acid, azelaic acid, dodecanedioic acid, terephthalic acid, isophthalic acid, 2-chloroterephthalic acid, 2-methylterephthalic acid, 5-methylisophthalic acid, 5-sodium-sulfoisophthalic acid, hexahydroterephthalic acid, hexahydroisophthalic acid and diglycolic acid. Particularly, the useful polyamides according to the present invention are polycaproamide (nylon 6), polyhexamethyleneadipamide (nylon 66), polyhexamethylenesebacamide (nylon 610), polyhexamethylenedodecamide (nylon 612), polyundecanamide (nylon 11), polydodecanamide (nylon 12), polytrimethylhexamethyleneterephthalamide (nylon TMDT), polyhexamethyleneisophthalamide (nylon 6I), polyhexamethyleneterephthalamide (nylon 6T), polybis(4-aminocyclohexyl)methanedodecamide (nylon PACM 12), polymetaxyleneadipamide (nylon MXD 6), polyundecamethyleneterephthalamide (nylon 11T), polydedecamethyleneterephthalamide (nylon 12T), and their copolymers and mixtures.

The polyamides used here have no restriction in the degree of polymerization, and those of a relative viscosity within the range of 1.5-5.0 can be chosen, as desired. For the manufacturing method of polyamide, there is no restriction, and the polyamides can be prepared by any well-known method such as melt polymerization or solid phase polymerization.

The polyolefin used according to the present invention is a polymer which has as a main component an α-olefin or diene of a carbon atom number of 2-20 such as, for example, ethylene, propylene, butene-1, pentene-1, 4-methylpentene-1, isobutylene, 1,4-hexadiene, dicyclopentadiene, 2,5-norbonadiene, 5-ethyl-2,5-norbornadiene, 5-ethylidenenorbornene, 5-(1'-propenyl)-2-norbornene, butadiene, isoprene and chloroprene.

As a specific example of polyolefin particularly useful according to the present invention, there may be cited polyethylene, polypropylene, polybutene, poly(4-methylpentene-1), poly(ethylene/propylene), poly(ethylene/butene-1), poly(ethylene/propylene/1,4-hexadiene), poly(ethylene/propylene/dicyclopentadiene), poly(ethylene/propylene/2,5-norbornadiene) or poly(ethylene/propylene/5-ethylidenenorbornene). For the degree of polymerization of the polyolefin, there is no restriction particularly, and a polyolefin of a melt index within the range of 0.05-50 g/10 min can be chosen, as desired. Also, for the manufacturing method of polyolefin, there is no restriction, and a well-known method such as high pressure radical polymerization, low pressure catalytic method or solution polymerization is usable.

The α,β-unsaturated imide and α,β-unsaturated amide compounds used according to the present invention include, for example, maleimide, N-methylmaleimide, N-ethylmaleimide, N-propylmaleimide, N-butylmaleimide, N-octylmaleimide, N-phenylmaleimide, N-(o-methylphenyl)-maleimide, N-(m-methylphenyl)-maleimide, N-(p-methylphenyl)maleimide, N-(methoxyphenyl)maleimide, N-(chlorophenyl)maleimide, N-(carboxyphenyl)maleimide, N-benzylmaleimide, N-naphthylmaleimide, N-cyclohexylmaleimide, itaconimide, N-methylitaconimide, N-phenylitaconimide, acrylamide, N-methylacrylamide, N-ethylacrylamide, N-propylacrylamide, N-butylacrylamide, N-octylacrylamide, N-stearylacrylamide, N-methylolacrylamide, N-hydroxymethylacrylamide, N-cyanoethylacrylamide, N-phenylacrylamide, N-tolylacrylamide, N,N-dimethylacrylamide, N,N-diethylacrylamide, N-methyl-N-ethylacrylamide, diacetoneacrylamide, methacrylamide, N-methylmethacrylamide, N-ethylmethacrylamide, N-propylmethacrylamide, N-butylmethacrylamide, N-stearylmethacrylamide, N-methylolmethacrylamide, N-hydroxymethylmethacrylamide, N-cyanoethylmethacrylamide, N-phenylmethacrylamide, N-benzylmethacrylamide, N,N-dimethylmethacrylamide and N,N-diethylmethacrylamide.

Unsaturated imide compounds and unsaturated amide compounds preferably usable according to the present invention are those melting at 180° C. or lower and boiling at 200° C. or higher under atmospheric pressure, and particularly, N-cyclohexylmaleimide, N-benzylmaleimide, N-phenylmaleimide, N-(carboxyphenyl)-maleimide, acrylamide and methacrylamide are adequate compounds.

The α,β-unsaturated carboxylic acids and α,β-unsaturated carboxylic acid anhydrides usable according to the present invention include, for example, acrylic acid, methacrylic acid, maleic acid, itaconic acid, crotonic acid, methylmaleic acid, methylfumaric acid, mesaconic acid, citraconic acid, glutaconic acid, methyl hydrogen maleate, ethyl hydrogen maleate, butyl hydrogen maleate, methyl hydrogen itaconate, ethyl hydrogen itaconate, maleic anhydride, itaconic anhydride and citraconic anhydride. Among the unsaturated carboxylic acid derivatives, those melting at 180° C. or lower and boiling at 200° C. or higher under atmospheric pressure are preferably usable, and particularly suitable compounds are acrylic acid, methacrylic acid, maleic acid, fumaric acid, methyl hydrogen maleate, maleic anhydride and itaconic anhydride.

It is one of the features of the method of the present invention to use both of (c) α,β-unsaturated imide or α,β-unsaturated amide compounds and (d) α,β-unsaturated carboxylic compound or α,β-unsaturated carboxylic acid anhydride. Unsaturated imide and unsaturated amide compounds are effective for improving the compatibility of polyolefin to polyamide and have further a function not to degrade the molding fluidity. The unsaturated carboxylic acid derivative participates in the reaction of polyolefin with polyamide, and when the polyolefin is not well fixed in the polyamide matrix, the melt compounded gut is of poor spinnability, resulting in decrease of manufacturing efficiency. When the unsaturated carboxylic acid derivative is added in an excessive amount, the polyolefin reacts with the polyamide while it undergoes cross-linking, and so the flow of the whole compound is extremely deteriorated. Thus, the α,β-unsaturated imide compound and the α,β-unsaturated carboxylic acid compound or its anhydride play a different role respectively, and only when both are present, a valuable product is provided.

The organic peroxides used according to the present invention include, for example, cumene hydroperoxide, t-butyl cumyl peroxide, di-t-butyl peroxide, 2,5-dimethyl-2,5-di(t-butylperoxy)hexane, 2,5-dimethyl-2,5-di(t-butylperoxy)hexyne-(3), 2,5-dimethylhexane-2,5-dihydroperoxide, t-butyl hydroperoxide, diiospropylbenzene hydroperoxide, p-methane hydroperoxide, 1,1-bis-t-butylperoxy-3,3,5-trimethylcyclohexane, n-butyl-4,4-bis-t-butylperoxy valerate and t-butylperoxy benzoate. According to the method of the invention, the peroxide should decompose quickly at the melt compounding temperature, and organic peroxides of which the decomposition temperature showing a half-life of 1 minute is within the range of 150°–250° C. are preferably used.

According to the invention, to 100 parts by weight of a mixture of (a) 50–95% by weight, preferably 55–93% by weight or more preferably 60–90% by weight of a polyamide and (b) 5–50% by weight, preferably 7–45% by weight or more preferably 10–40% by weight of a polyolefin are added (c) 0.02–5 parts by weight, preferably 0.05–3 parts by weight or more preferably 0.07–1 part by weight of an α,β-unsaturated imide compound and/or α,β-unsaturated amide compound, (d) 0.01–3 parts by weight, preferably 0.02–1 part by weight or more preferably 0.05–0.8 part by weight of an α,β-unsaturated carboxylic acid compound and/or α,β-unsaturated carboxylic acid anhydride and (e) 0.001–0.8 part by weight, preferably 0.04–0.5 part by weight or more preferably 0.008–0.2 part by weight of an organic peroxide, and the mixture is melt compounded.

Deviation of the proportion of mixture of the polyamide and polyolefin from the foregoing limiting range is not desirable in that the intended balance of mechanical properties such as impact resistance and rigidity is not achieved.

Lower amounts of addition of the modifiers, that is, α,β-unsaturated imide compound, α,β-unsaturated amide compound and α,β-unsaturated carboxylic acid derivative than the lower limit values specified as above are not desirable in that the compatibility of polyamide and polyolefin is deteriorated and that the impact resistance and other mechanical properties are degraded. On the other hand, if the amounts of the modifiers exceed the foregoing upper limit values, all of the modifiers are not consumed for modification of the polyolefin, and the remaining modifiers bleed out on the surface of the mold to impair the appearance or cause undesirable phenomena such as deterioration of the stability of polyolefin.

According to the present invention, the polyamide and polyolefin in the form of pellets, powder or chips are usually premixed with the α,β-unsaturated imide compound, α,β-unsaturated carboxylic acid compound or its anhydride and organic peroxide, and then is fed to a single or multiple screw extruder having a sufficient compounding capacity for melt compounding.

According to the method of the invention, the polyolefin is partially cross-linked during the process of compounding. The extent of cross-linking can be determined by the solubility to a solvent. From the following experiment, it was found that before melt compounding with a polyamide, a poly(ethylene/propylene) copolymer completely soluble in a solvent such as toluene, when dispersed in the polyamide matrix according to the method of the invention, would have a cross-linked structure having an insoluble part in the solvent. That is, the poly(ethylene/propylene) copolymer remaining after hydrolysis of the polyamide with hydrochloric acid did not completely dissolve in toluene and had a cross-linked insoluble part present. According to the method of the invention, it has become possible to finely disperse a partially cross-linked modified polyolefin in a polyamide matrix which has not been conceivable by the common knowledge heretofore maintained. As the rubber component is cross-linked, the impact resistance and rigidity are further improved, and a material of a very high practical value is obtainable.

The resin compositions of the present invention may have any other component or components such as pigment, dye, reinforcing agent, filler, heat stabilizer, antioxidant, weather stabilizer, lubricant, nuleating agent, antiblocking agent, mold releasing agent, plasticizer, flame retarding agent, antistatic agent and any other polymer added thereto so long as the moldability and physical properties are not damaged.

The resin compositions of the invention are applicable to injection molding, extrusion molding, blow molding, compression molding and other molding processes ordinarily used for the thermoplastic resins, and when molded, they provide molds having the well balanced mechanical properties which are useful as automobile parts, mechanical parts, electric and electronic parts and general goods.

The present invention will now be described in detail with reference to some embodiments. Evaluation of the characteristics of the polymers and molds noted in the embodying examples and references was made according to the following methods.

(1) Relative viscosity of polyamide: JIS K6810
(2) Melt index: JIS K7210
(3) Tensile properties: ASTM D638
(4) Flexural properties: ASTM D790
(5) Izod impact strength: ASTM D256
(6) Injection molding flow: Spiral flow length evaluated

EXAMPLE 1

Through melt polymerization of ε-caprolactum, nylon 6 of a relative viscosity of 3.10 was prepared. Polymerizing a mixture of 75 mol % of ethylene and 25 mol % of propylene, a poly(ethylene/propylene) copolymer was prepared. For a total 100 parts by weight of nylon 6 75% by weight and poly(ethylene/propylene) copolymer 25% by weight, 0.4 part by weight of N-cyclohexylmaleimide, 0.3 part by weight of maleic anhydride and 0.1 part by weight of 2,5-dimethyl-2,5-di(t-butylperoxy)hexyne-(3) were added, and the whole was premixed, then it was melted and compounded at 250° C. with a 60 mmφ twin screw extruder used into pellets. Spinnability of the gut discharged out of the extruder was very stable, and gut cutting occurred scarcely during the continuous run for long hours.

The pellet obtained here was subjected to analysis and test according to the following method.

The pellet was treated with hydrochloric acid for hydrolysis of the nylon part, and then infrared absorption spectrum of the residue was examined. The residue had absorptions noted at 1460 cm$^{-1}$, 1380 cm$^{-1}$ and 710 cm$^{-1}$ and was thus found to be a modified poly(ethylene/propylene) copolymer. This remaining modified poly(ethylene/propylene) copolymer did not completely dissolve in toluene and was thus found to be partially cross-linked during the compounding process. It was confirmed that the original poly(ethylene/propylene) copolymer completely dissolve in toluene and that the partial cross-linking was not caused by the hydrochloric acid treatment.

Next, the pellet obtained here was vacuum dried and was injection molded into a test specimen, and the flow at the time of molding and the mechanical properties of the test specimen thus obtained were tested, as shown in Table 1. As shown, it was found to be a material of high practical value.

REFERENCE 1

To 100 parts by weight of the poly(ethylene/propylene) copolymer used in Example 1, 1.6 parts by weight of N-cyclohexylmaleimide, 1.2 parts by weight of maleic anhydride and 0.4 part by weight of 2,5-dimethyl-2,5-di(t-butylperoxy)hexyne-(3) were added, and the mixture was compounded at 250° C. with a 40 mm$\phi$ extruder used. The modified poly(ethylene/propylene) copolymer obtained here did not completely dissolve in toluene and was found to be cross-linked.

To nylon 6 used in Example 1, 25% by weight of this cross-linked modified poly(ethylene/propylene) copolymer was added, then the mixture was compounded under the same condition to that of Example 1, and the physical properties of the injection molded test specimen were evaluated. The results are shown in Table 1. It was thus found that according to the method of mixing and compounding the cross-linked polyolefin with the nylon, dispersion of the polyolefin would not be good, the impact resistance would not be satisfactory and the surface appearance of the mold would be poor and that it would be inadequate unless the partial cross-linking and modification of polyolefin would proceed simultaneously during compounding process with nylon.

REFERENCES 2 to 5

The amounts of N-cyclohexylmaleimide and maleic anhydride in Example 1 were changed as shown in Table 1, and without otherwise changing Example 1 an evaluation of the mechanical properties of the extruder compounded and injection molded test specimens was carried out. It was found as shown by Table 1 that extreme depression of spinability, melt flowability or mechanical properties occurred when the amounts of modifiers deviate from the ranges specified in the invention.

Where a conventional horizontal arrow appears in any column of any of the following Tables, the arrow indicates the same representation as appeared in the horizontally adjacent space in the column immediately to the left. For example the top entry in Reference 1 of Table 1 is "N-6" which is the entry appearing under the heading "Example 1".

TABLE 1

|   |   | Example 1 | Reference 1 | Reference 2 | Reference 3 | Reference 4 | Reference 5 |
|---|---|---|---|---|---|---|---|
| (a) | Polyamide | N-6 | → | → | → | → | → |
|   | (Relative viscosity) | (3.10) | (→) | (→) | (→) | (→) | (→) |
|   | (Compounding) (Weight %) | (75) | (→) | (→) | (→) | (→) | (→) |
| (b) | Polyolefin | EPR | → | → | → | → | → |
|   | (Melt index) (g/10 min) | (7) | (→) | (→) | (→) | (→) | (→) |
|   | (Compounding) (Weight %) | (25) | (→) | (→) | (→) | (→) | (→) |
| (c) | Unsaturated imide compound | NCHM | → | → | → | → | — |
|   | (Addition) (Parts by weight/ 100 Parts by weight) | (0.4) | → | → | (0) | (10) | (0.4) |
| (d) | Unsaturated carboxylic acid or its anhydride | MLA | → | — | → | → | → |
|   | (Addition) (Parts by weight/ 100 Parts by weight) | (0.3) | (→) | (0) | (0.3) | → | (10) |
| (e) | Organic peroxide | DBPH | → | → | → | → | → |
|   | (Addition) (Parts by weight/ 100 Parts by weight) | (0.1) | (→) | (→) | (→) | (→) | (→) |
|   | Compounding method | One-stage | Two-stage | One-stage | → | → | → |
|   | Discharge from extruder | Stable, good | Practicable | Poor spinnability of gut | Gut cutting frequently | Gut tending to foam | Viscosity increasing abnormally |
|   | Injection molding flow |   |   |   |   |   |   |
|   | (Spiral flow length) (mm) | 110 | 83 | 118 | 76 | 113 | 28 |
|   | Tensile strength (kg/cm$^2$) | 500 | 450 | 510 | 500 | 480 | 500 |
|   | Flexural strength (kg/cm$^2$) | 700 | 700 | 710 | 710 | 650 | 700 |
|   | Flexural modulus (kg/cm$^2$) | 18,200 | 18,300 | 18,500 | 18,300 | 17,600 | 18,000 |
|   | Izod impact strength (kg · cm/cm notch) | 65 | 13 | 32 | 65 | 60 | 63 |
|   | Mold surface appearance | Good | Lusterless & not good | Good | Ordinary | Bleed-out noted | Not good |

(a) N-6: Nylon 6;
(b) EPR: Poly(ethylene/propylene) copolymer;
(c) NCHM: N-cyclohexylmaleimide;
(d) MLA: Maleic anhydride;
(e) DBPH: 2,5-dimethyl-2,5-di(t-butylperoxy)hexyne-(3)
Injection molding flow: Temperature, 250° C.; Injection pressure, 1,000 kg/cm$^2$; Test specimen thickness, 1.0 mm
Mechanical properties: 23° C., dry

EXAMPLES 2 to 29

Changing the types and quantities of the polyamide, polyolefin, modifiers and peroxide and operating similarly to Example 1, the discharge stability from the extruder, injection molding flow and physical properties of the molded test specimens were tested, with the results shown in Table 2. It was found that in any case shown in Table 2, a material distinguished in extrusion workability, injection molding flow and mechanical properties would be obtainable.

TABLE 2

| Example | | 2 | 3 | 4 | 5 | 6 | 7 | 8 |
|---|---|---|---|---|---|---|---|---|
| (a) | Polyamide(i) | | | | | | | |
| | Type | N-66 | N-610 | N-612 | N-12 | N-6/66:85/15 | N-6/66:10/90 | N-6/12:80/20 |
| | Relative viscosity | 2.90 | 2.50 | 2.50 | 2.30 | 3.40 | 3.10 | 2.70 |
| | Compounding (Weight %) | 80 | 70 | 60 | 80 | 70 | 75 | 80 |
| (b) | Polyolefin(ii) | | | | | | | |
| | Type | E/PP | PP | PMP | PE | E/BT | ↑ | ↑ |
| | Melt index (g/10 min) | 7 | 13 | 25 | 20 | 5 | ↑ | ↑ |
| | Compounding (Weight %) | 20 | 30 | 40 | 20 | 30 | 25 | 20 |
| (c) | Unsaturated imide or amide compound | N-phenylmaleimide | ↑ | ↑ | ↑ | N-ethylmaleimide | ↑ | N-butylmaleimide |
| | Addition (Parts by weight/100 Parts by weight) | 0.3 | ↑ | ↑ | ↑ | 0.25 | ↑ | 0.4 |
| (d) | Unsaturated carboxylic acid or its anhydride | Maleic anhydride | ↑ | ↑ | ↑ | Maleic acid | ↑ | Methacrylic acid |
| | Addition (Parts by weight/100 Parts by weight) | 0.15 | ↑ | ↑ | ↑ | 0.2 | ↑ | 0.2 |
| (e) | Organic peroxide | Cumene hydroperoxide | ↑ | ↑ | ↑ | ↑ | Butylperoxy benzoate | ↑ |
| | Addition (Parts by weight/100 Parts by weight) | 0.07 | ↑ | ↑ | ↑ | ↑ | 0.05 | 0.08 |
| | Discharge from extruder | Good | ↑ | ↑ | ↑ | ↑ | ↑ | ↑ |
| | Polyolefin cross-linking | Yes | ↑ | ↑ | ↑ | ↑ | ↑ | ↑ |
| | Injection molding temperature (°C.) | 280 | 250 | 270 | 230 | 250 | 270 | 230 |
| | Injection molding pressure (kg/cm²) | 1,000 | 1,000 | 1,000 | 1,000 | 1,000 | 1,000 | 1,000 |
| | Injection molding spiral flow length (mm) | 103 | 110 | 85 | 100 | 90 | 100 | 92 |
| | Tensile strength (kg/cm²) | 550 | 650 | 660 | 440 | 430 | 450 | 420 |
| | Flexural strength (kg/cm²) | 780 | 810 | 830 | 650 | 650 | 680 | 630 |
| | Flexural modulus (kg/cm²) | 18,800 | 23,200 | 24,000 | 14,000 | 17,000 | 17,100 | 15,000 |
| | Izod impact strength (kg · cm/cm notch) | 55 | 15 | 18 | 90 | Not broken | 73 | Not broken |

| Examples | | 9 | 10 | 11 | 12 | 13 | 14 | 15 |
|---|---|---|---|---|---|---|---|---|
| (a) | Polyamide(i) | | | | | | | |
| | Type | N-6I | N-MXD6 | N-PACM12 | N-TMDT | N-12T | N-6I/PACMT:50/50 | N-6 |
| | Relative viscosity | 2.10 | 2.50 | 2.30 | 2.60 | 2.40 | 1.85 | 2.80 |
| | Compounding (Weight %) | 65 | 70 | 60 | 70 | 75 | 60 | 80 |
| (b) | Polyolefin(ii) | | | | | | | |
| | Type | E/PP/DCPD | ↑ | E/PP/ND | ↑ | E/PP/EN | ↑ | ↑ |
| | Melt index (g/10 min) | 2.5 | ↑ | 5 | ↑ | 0.8 | ↑ | ↑ |
| | Compounding (Weight %) | 35 | 30 | 40 | 30 | 25 | 40 | 20 |
| (c) | Unsaturated imide or amide compound | N-(p-methylphenyl)maleimide | ↑ | Itaconimide | ↑ | N-(Carboxphenyl)maleimide | ↑ | ↑ |
| | Addition (Parts by weight/100 Parts by weight) | 0.3 | ↑ | 0.5 | ↑ | ↑ | ↑ | ↑ |
| (d) | Unsaturated carboxylic acid or its anhydride | Itaconic anhydride | ↑ | Ethyl hydrogen maleate | ↑ | Methylmaleic acid | ↑ | ↑ |
| | Addition (Parts by weight/100 Parts by weight) | 0.15 | ↑ | 0.2 | ↑ | 0.25 | ↑ | ↑ |
| (e) | Organic peroxide | Butylcumyl peroxide | ↑ | ↑ | ↑ | ↑ | Dimethyl(butylperoxy)hexane | ↑ |
| | Addition (Parts by weight/100 Parts by weight) | 0.08 | ↑ | 0.12 | ↑ | ↑ | 0.06 | ↑ |
| | Discharge from extruder | Good | | | | | | |

TABLE 2-continued

| Examples | | 16 | 17 | 18 | 19 | 20 | 21 | 22 |
|---|---|---|---|---|---|---|---|---|
| (a) | Polyamide[i] | | | | | | | |
| | Type | N-6 | N-610 | N-612 | N-12 | N-6/66:85/15 | N-6/66:10/90 | N-6/12:80/20 |
| | Relative viscosity | 2.90 | 2.50 | 2.50 | 2.30 | 3.40 | 3.10 | 2.70 |
| | Compounding (Weight %) | 80 | 70 | 60 | 80 | 70 | 75 | 80 |
| (b) | Polyolefin[ii] | | | | | | | |
| | Type | E/PP | PP | PM | PE | E/BT | → | → |
| | Melt index (g/10 min) | 7 | 13 | 25 | 20 | 5 | → | → |
| | Compounding (Weight %) | 20 | 30 | 40 | 20 | 30 | 25 | 20 |
| (c) | Unsaturated imide or amide compound | Methacrylamide | → | → | → | N-ethylacrylamide | → | N-butylacrylamide |
| | Addition (Parts by weight/100 Parts by weight) | 0.3 | → | → | → | 0.25 | → | 0.4 |
| (d) | Unsaturated carboxylic acid or its anhydride | Maleic anhydride | → | → | → | Maleic acid | → | Methacrylic acid |
| | Addition (Parts by weight/100 Parts by weight) | 0.3 | → | → | → | 0.2 | → | 0.2 |
| (e) | Organic peroxide | Cumene hydroperoxide | → | → | → | → | Butylperoxy benzoate | → |
| | Addition (Parts by weight/100 Parts by weight) | 0.07 | → | → | → | → | 0.05 | 0.08 |
| | Discharge from extruder | Good | | | | | | |
| | Polyolefin cross-linking | Yes | → | → | → | → | → | → |
| | Injection molding temperature (°C.) | 280 | 250 | 270 | 230 | 250 | 270 | 230 |
| | Injection molding pressure (kg/cm²) | 1,000 | 1,000 | 1,000 | 1,000 | 1,000 | 1,000 | 1,000 |
| | Injection molding spiral flow length (mm) | 100 | 110 | 85 | 100 | 80 | 105 | 90 |
| | Tensile strength (kg/cm²) | 550 | 650 | 660 | 440 | 420 | 450 | 420 |
| | Flexural strength (kg/cm²) | 780 | 810 | 830 | 650 | 650 | 670 | 630 |
| | Flexural modulus (kg/cm²) | 18,500 | 23,200 | 24,000 | 14,000 | 17,000 | 17,100 | 15,000 |
| | Izod impact strength (kg·cm/cm notch) | 52 | 16 | 20 | 85 | Not broken | 70 | Not broken |

| Examples | | 23 | 24 | 25 | 26 | 27 | 28 | 29 |
|---|---|---|---|---|---|---|---|---|
| (a) | Polyamide[i] | | | | | | | |
| | Type | N-6I | N-MXD6 | N-PACM12 | N-TMDT | N-12T | N-6IPACMT:50/50 | N-6 |
| | Relative viscosity | 2.10 | 2.50 | 2.30 | 2.60 | 2.40 | 1.85 | 2.80 |
| | Compounding (Weight %) | 65 | 70 | 60 | 70 | 75 | 60 | 80 |
| (b) | Polyolefin[ii] | | | | | | | |
| | Type | E/PP/DCPD | → | E/PP/ND | → | E/PP/EN | → | → |
| | Melt index (g/10 min) | 2.5 | → | 5 | → | 0.8 | → | → |
| | Compounding (Weight %) | 35 | 30 | 40 | 30 | 25 | 40 | 20 |
| (c) | Unsaturated imide or amide compound | N-phenylacrylamide | → | N,N-dimethylacrylamide | → | N-hydroxymethylacrylamide | → | → |
| | Addition (Parts by weight/ | 0.3 | → | 0.5 | → | → | → | → |

TABLE 2-continued

| | | Itaconic anhydride | → | Itaconic hydrogen | → | Methylmaleic acid | → |
|---|---|---|---|---|---|---|---|
| (d) | 100 Parts by weight) Unsaturated carboxylic acid or its anhydride | | | | | | |
| | Addition (Parts by weight/ 100 Parts by weight) | 0.15 | | 0.2 | | 0.25 | |
| (e) | Organic peroxide | Butylcumyl peroxide | → | → | → | → | Dimethyl(butylperoxy) hexane |
| | Addition (Parts by weight/ 100 Parts by weight) | 0.08 | | 0.12 | | | 0.06 |
| | Discharge from extruder | Good | → | → | → | → | → |
| | Polyolefin cross-linking | Yes | → | → | → | → | → |
| | Injection molding temperature (°C.) | 250 | 270 | 300 | 300 | 300 | 250 |
| | Injection molding pressure (kg/cm²) | 1,000 | 1,000 | 1,000 | 1,000 | 1,000 | 1,000 |
| | Injection molding spiral flow length (mm) | 65 | 80 | 72 | 77 | 80 | 120 |
| | Tensile strength (kg/cm²) | 440 | 520 | 530 | 550 | 540 | 550 |
| | Flexural strength (kg/cm²) | 650 | 700 | 720 | 760 | 760 | 760 |
| | Flexural modulus (kg/cm²) | 17,000 | 18,400 | 18,600 | 19,200 | 19,500 | 19,000 |
| | Izod impact strength (kg · cm/cm notch) | 41 | 36 | 30 | 27 | 42 | 80 |

(i)Polyamide
N-6: Polycaproamide; N-66: Polyhexamethyleneadipamide; N-610: Polyhexamethylenesebacamide; N-612: Polyhexamethylenedodecanamide; N-12: Polydodecanamide; N-6/66 (85/15): Poly(caproamide/hexamethyleneadipamide) copolymer (weight %); N-6/66 (10/90): Same as above; N-6/12 (80/20): Poly(caproamide/dodecaneamide) copolymer (weight %); N-6I: Polyhexamethyleneisophthalamide; N-MXD6: Polymetaxyleneadipamide; N-PACM12: Polybis(4-aminocyclohexyl)methanedodecamide; N-TMDT: Polytrimethylhexamethylen eterephthalamide; N-6I/PACMT (50/50): Poly(hexamethyleneisophthalamide/bis(4-aminocyclohexyl) methaneterephthalamide) copolymer (weight %).
(ii)Polyolefin
E/PP: Poly(ethylene/propylene) copolymer (80/20 molar %); PP: Polypropylene; PMP: Poly(4-methylpentene-1); PE: Polyethylene; E/BT: Poly(ethylene/butene-1) copolymer (85/15 molar %); E/PP/DCPD: Poly(ethylene/propylene/cyclopentadiene) copolymer (70/20/10 molar %); E/PP/ND: Poly(ethylene/propylene/norbornadiene) copolymer (65/25/10 molar %); E/PP/EN: Poly(ethylene/propylene/5-ethylidenenorbornene) copolymer (70/25/5 molar %).

EXAMPLE 30

Nylon 6 of a relative viscosity of 2.80 was prepared by melt polymerization of ε-caprolactam. To an ethylene/propylene copolymer consisting of 80 molar percent of ethylene and 20 molar percent of propylene, N-phenylmaleimide and maleic anhydride were added together with a small amount of di-t-butylperoxide, and by compounding the mixture at 200° C. with an extruder used, a modified polyolefin of a melt index of 1 g/10 min having 0.3 molar percent of N-phenylmaleimide and 0.05 molar percent of maleic anhydride graft introduced was prepared.

Weighing 70% by weight of nylon 6 and 30% by weight of the copolymer of poly(ethylene/propylene)-g-N.phenyl maleimide and maleic anhydride, they were premixed then successively melt compounded at 250° C. with a 60 mmφ extruder used, and the discharge stability was examined. The gut discharged from the extruder was of very good spinnability and was scarcely cut during long hours of continuous run.

The composition obtained here was vacuum dried then injection molded into a test specimen for measurement of the mechanical properties. With the results shown in Table 3 it was found to be a material having a high practical value.

REFERENCES 6 to 9

The amounts of N-phenylmaleimide and maleic anhydride in Example 30 were changed as shown in Table 3, and without otherwise changing Example 30 an evaluation of the mechanical properties of the extruder compounded and injection molded test specimens was carried out. It was found as shown in Table 3 that remarkable decrease in the stability of melt gut, melt flowability, or mechanical properties occurred when the modification of polyolefin was carried out in the ranges deviated from specification of the invention.

TABLE 3

|  |  | Example 30 | Reference 6 | Reference 7 | Reference 8 | Reference 9 |
|---|---|---|---|---|---|---|
| (A) | Polyamide | N-6 | → | → | → | → |
|  | (Relative viscosity) | (2.80) | (→) | (→) | (→) | (→) |
| (B) | Modified polyolefin | EPR-g-NPMI/MLA | → | → | → | → |
|  | (Functional group) (Molar %) | (0.3/0.05) | (0.3/0) | (0/0.05) | (5/0.05) | (0.3/3) |
|  | (Melt index) (g/10 min) | (1.0) | (→) | (→) | (→) | (→) |
| Compounding (A)/(B) (Weight %) |  | 70/30 | → | → | → | → |
| Discharge from extruder |  | Good | Surging occurring frequently; Poor take-off of discharged gut | Gut cutting frequently | Greatly colored | Viscosity increasing abnormally |
| Injection molding flow |  |  |  |  |  |  |
| (Spiral flow length (mm) |  | 100 | 120 | 110 | 90 | 45 |
| Tensile strength (kg/cm$^2$) |  | 480 | 490 | 480 | 450 | 450 |
| Flexural strength (kg/cm$^2$) |  | 690 | 690 | 690 | 640 | 650 |
| Flexural modulus (kg/cm$^2$) |  | 17,200 | 17,300 | 17,200 | 16,900 | 17,000 |
| Izod impact strength (kg · cm/cm notch) |  | 90 | 40 | 48 | 90 | 90 |

(A) N-6: Nylon 6;
(B) EPR-g-NPMI/MLA: Poly(ethylene/propylene)-g-N.phenylmaleimide and maleic anhydride copolymer;
Injection molding flow: Temperature, 250° C.; Injection pressure, 1,000 kg/cm$^2$; Test specimen thickness, 1.0 mm
Mechanical properties: 23° C., dry

EXAMPLES 31 to 66

Changing the types and quantities of the polyamide and polyolefin and operating similarly to Example 30, the discharge stability of the gut from the extruder, injection moldability of the compositions and physical properties of the molded test specimens were evaluated, with the results shown in Table 4. It was found that in any of the cases shown in Table 4, there would be provided a material showing distinguished extrusion workability, injection molding flow and impact resistance.

TABLE 4

| Examples | | 31 | 32 | 33 | 34 | 35 | 36 | 37 | 38 | 39 | 40 | 41 | 42 | 43 |
|---|---|---|---|---|---|---|---|---|---|---|---|---|---|---|
| (A) Polyamide[a] | Type | N-66 | N-610 | N-612 | N-12 | N-6/66:85/15 | N-6/66:10/90 | N-6/12:80/20 | N-6I | N-MXD6 | N-PACM12 | N-TMDT | N-12T | N-6I/PACMT:50/50 |
| | Relative viscosity | 2.90 | 2.50 | 2.50 | 2.30 | 3.40 | 3.10 | 2.70 | 2.10 | 2.50 | 2.30 | 2.60 | 2.40 | 1.85 |
| | Compounding (Weight %) | 75 | 80 | 60 | 80 | 70 | 70 | 80 | 50 | 70 | 75 | 70 | 70 | 70 |
| (B) Modified polyolefin[b] | Type | [A] | [A] | [B] | [B] | [C] | [C] | [C] | [D] | [D] | [D] | [E] | [E] | [E] |
| | Melt index (g/10 min) | 1.0 | 1.0 | 5.0 | 5.0 | 0.5 | 0.5 | 0.5 | 0.6 | 0.6 | 0.6 | 8.4 | 8.4 | 8.4 |
| | Compounding (Weight %) | 25 | 20 | 40 | 20 | 30 | 30 | 20 | 50 | 30 | 25 | 30 | 30 | 30 |
| Discharge from extruder | | Good | → | → | → | → | → | → | Good | → | → | → | → | → |
| Injection molding | | | | | | | | | | | | | | |
| Temperature (°C.) | | 280 | 250 | 250 | 230 | 250 | 270 | 230 | 250 | 270 | 300 | 300 | 300 | 300 |
| Injection pressure (kg/cm²) | | 1,000 | 1,000 | 1,000 | 1,000 | 1,000 | 1,000 | 1,000 | 1,000 | 1,000 | 1,000 | 1,000 | 1,000 | 1,000 |
| Spiral flow length (mm) | | 95 | 110 | 80 | 100 | 90 | 105 | 100 | 67 | 88 | 97 | 74 | 80 | 71 |
| Tensile strength (kg/cm²) | | 510 | 450 | 430 | 430 | 430 | 440 | 420 | 450 | 520 | 530 | 550 | 540 | 580 |
| Flexural strength (kg/cm²) | | 720 | 640 | 620 | 640 | 650 | 670 | 620 | 630 | 700 | 720 | 760 | 740 | 750 |
| Flexural modulus (kg/cm²) | | 18,000 | 17,000 | 15,200 | 15,300 | 16,500 | 16,800 | 15,000 | 17,100 | 18,500 | 18,800 | 19,800 | 17,800 | 18,800 |
| Izod impact strength (kg·cm/cm notch) | | 80 | 85 | Not broken | 95 | 90 | 73 | Not broken | 68 | 44 | 52 | 39 | 50 | 45 |

| Examples | | 44 | 45 | 46 | 47 | 48 | 49 | 50 | 51 | 52 | 53 | 54 | 55 | 56 | 57 | 58 |
|---|---|---|---|---|---|---|---|---|---|---|---|---|---|---|---|---|
| (A) Polyamide[a] | Type | N-6 | N-6 | N-66 | N-66 | N-66 | N-66 | N-610 | N-612 | N-12 | N-6/66:85/15 | N-6/66:10/90 | N-6/12:80/20 | N-6I | N-MXD6 | N-PACM12 |
| | Relative viscosity | 2.80 | 2.80 | 2.50 | 3.00 | 3.00 | 2.90 | 2.50 | 2.50 | 2.30 | 3.40 | 3.10 | 2.70 | 2.10 | 2.50 | 2.30 |
| | Compounding (Weight %) | 70 | 75 | 50 | 70 | 70 | 75 | 80 | 60 | 80 | 70 | 70 | 80 | 50 | 70 | 75 |
| (B) Modified polyolefin[b] | Type | [F] | [G] | [H] | [I] | [I] | [A] | [A] | [B] | [B] | [C] | [C] | [C] | [D] | [D] | [D] |
| | Melt index (g/10 min) | 20 | 10 | 15 | 5.0 | 5.0 | 1.0 | 1.0 | 5.0 | 5.0 | 0.5 | 0.5 | 0.5 | 0.6 | 0.6 | 0.6 |
| | Compounding (Weight %) | 30 | 25 | 50 | 30 | 30 | 25 | 20 | 40 | 20 | 30 | 30 | 20 | 50 | 30 | 25 |
| Discharge from extruder | | → | Good | → | → | → | Good | → | → | → | → | → | → | Good | → | → |
| Injection molding | | | | | | | | | | | | | | | | |
| Temperature (°C.) | | 250 | 250 | 280 | 275 | 275 | 280 | 250 | 250 | 230 | 250 | 270 | 230 | 250 | 270 | 300 |
| Injection pressure (kg/cm²) | | 1,000 | 1,000 | 1,000 | 1,000 | 1,000 | 1,000 | 1,000 | 1,000 | 1,000 | 1,000 | 1,000 | 1,000 | 1,000 | 1,000 | 1,000 |
| Spiral flow length (mm) | | 150 | 110 | 120 | 90 | 82 | 90 | 100 | 70 | 85 | 85 | 100 | 90 | 60 | 85 | 90 |
| Tensile strength (kg/cm²) | | 650 | 580 | 700 | 520 | 500 | 540 | 450 | 480 | 430 | 430 | 440 | 420 | 450 | 520 | 580 |
| Flexural strength (kg/cm²) | | 800 | 700 | 950 | 680 | 650 | 750 | 640 | 650 | 640 | 650 | 680 | 620 | 630 | 730 | 720 |
| Flexural modulus (kg/cm²) | | 23,000 | 19,500 | 25,500 | 16,800 | 16,500 | 18,000 | 17,000 | 15,200 | 15,300 | 16,700 | 16,800 | 15,200 | 17,200 | 18,500 | 18,800 |
| Izod impact strength (kg·cm/cm notch) | | 15 | 80 | 15 | 90 | 80 | 80 | 80 | Not broken | 95 | 90 | 78 | Not broken | 70 | 45 | 52 |

| Examples | | 59 | 60 | 61 | 62 | 63 | 64 | 65 | 66 |
|---|---|---|---|---|---|---|---|---|---|
| (A) Polyamide[a] | Type | N-TMDT | N-12T | N-6I/PACMT:50/50 | N-6 | N-6 | N-66 | N-66 | N-66 |
| | Relative viscosity | 2.60 | 2.40 | 1.85 | 2.80 | 2.80 | 2.50 | 3.00 | 3.00 |
| | Compounding (Weight %) | 70 | 70 | 70 | 70 | 75 | 50 | 70 | 70 |
| (B) Modified polyolefin[b] | Type | [E] | [E] | [E] | [F] | [G] | [H] | [I] | [I] |
| | Melt index (g/10 min) | 8.4 | 8.4 | 8.4 | 20 | 10 | 15 | 5.0 | 1.0 |
| | Compounding (Weight %) | 30 | 30 | 30 | 30 | 25 | 50 | 30 | 30 |
| Discharge from extruder | | → | → | → | → | Good | → | → | → |
| Injection molding | | | | | | | | | |
| Temperature (°C.) | | 300 | 300 | 300 | 250 | 250 | 280 | 275 | 275 |
| Injection pressure (kg/cm²) | | 1,000 | 1,000 | 1,000 | 1,000 | 1,000 | 1,000 | 1,000 | 1,000 |
| Spiral flow length (mm) | | 70 | 75 | 70 | 140 | 100 | 110 | 85 | 80 |

TABLE 4-continued

| Tensile strength (kg/cm²) | 550 | 540 | 580 | 660 | 580 | 700 | 520 | 520 |
|---|---|---|---|---|---|---|---|---|
| Flexural strength (kg/cm²) | 760 | 760 | 760 | 800 | 700 | 960 | 690 | 650 |
| Flexural modulus (kg/cm²) | 19,600 | 17,800 | 18,800 | 23,000 | 19,600 | 25,500 | 16,800 | 16,500 |
| Izod impact strength (kg · cm/cm notch) | 39 | 50 | 50 | 15 | 82 | 16 | 90 | 80 |

(a)Polyamide
N-6: Polycaproamide; N-66: Polyhexamethyleneadipamide; N-610: Polyhexamethylenesebacamide; N-612: Polyhexamethylenedodecamide; N-12: Polydodecanamide; N-6/66 (85/15): Poly(caproamide/hexamethyleneadipamide) copolymer (% by weight);
N-6/66 (10/90): Same as above; N-6/12 (80/20): Poly(caproamide/dodecanamide) copolymer (% by weight); N-6I: Polyhexamethyleneisophthalamide; N-MXD6: Polymethaxylyleneadipamide; N-PACM12: Polybis(4-aminocyclohexyl)methanedodecamide;
N-TMDT: Polytrimethylhexamethyleneterephthalamide; N-12T: Polydodecamethyleneterephthalamide; N-6I/PACMT (50/50): Poly(hexamethyleneisophthalamide/bis(4-aminocyclohexyl)methaneterephthalamide) copolymer (% by weight).
(b)Modified polyolefin
[A]: Poly(ethylene/propylene): 80/20 (molar percent) copolymer having 0.3 molar percent of N-phenylmaleimide and 0.05 molar percent of maleic anhydride grafted.
[B]: Poly(ethylene/propylene): 80/20 (molar percent) copolymer having 0.5 molar percent of maleimide and 0.1 molar percent of fumaric acid grafted.
[C]: Poly(ethylene/butene-1): 85/15 (molar percent) copolymer having 0.5 molar percent of N-(p-methylphenyl)maleimide and 0.04 molar percent of itaconic anhydride grafted.
[D]: Poly(ethylene/propylene/dicyclopentadiene): 70/20/10 (molar percent) copolymer having 1 molar percent of N-phenylmaleimide and 0.1 molar percent of maleic anhydride grafted.
[E]: Poly(ethylene/propylene/5-ethylidenenorbornene): 70/25/5 (molar percent) copolymer having 0.1 molar percent of N-(carboxyphenyl)maleimide grafted.
[F]: Polypropylene having 0.5 molar percent of N-phenylmaleimide and 0.05 molar percent of maleic anhydride grafted.
[G]: Polyethylene having 0.5 molar percent of N-phenylmaleimide and 0.05 molar percent of maleic anhydride grafted.
[H]: Poly(4-methylpentene-1) having 0.5 molar percent of N-phenylmaleimide and 0.05 molar percent of maleic anhydride grafted.
[I]: Poly(ethylene/maleimide/maleic anhydride): 96/3/1 (molar percent) copolymer.
[J]: Poly(ethylene/propylene/butyl acrylate/maleic anhydride): 80/10/9/1 (molar percent) copolymer.

What is claimed is:

1. A resin composition having improved flowability when discharged from an extruder comprising: (A) 50-95 percent by weight of a polyamide and (B) 5-50 percent by weight of a modified polyolefin containing in the side chain 0.02-4 molar percent based upon the weight of the modified polyolefin of functional groups (C) expressed by formulas selected from the group consisting of one or both of (I) and (II) and 0.04-1 molar percent based upon the weight of the modified polyolefin of functional groups (d) expressed by formulas selected from the group consisting of one or both of (III) and (IV)

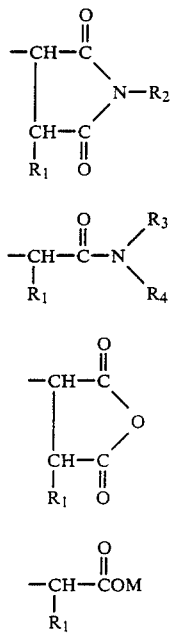

wherein $R_1$ represents a hydrogen atom or methyl group; $R_2$, $R_3$ and $R_4$ represent respectively a hydrogen atom or an aliphatic, alicyclic or aromatic residual group having 1-30 carbon atoms; and M represents a hydrogen atom or a metal ion of a valence of 1-3.

2. A resin composition defined in claim 1 wherein the modified polyolefin is partially cross-linked.

3. A resin composition defined in claim 1 which is comprised of 55-93 percent by weight of the polyamide (A) and 7-45 percent by weight of the modified polyolefin (B).

4. A resin composition defined in claim 1 which is comprised of 60-90 percent by weight of the polyamide (A) and 10-40 percent by weight of the modified polyolefin (B).

5. A resin composition defined in claim 1 wherein $R_2$ in formula (I) is a functional group selected from the group consisting of one or more of the following: alkyl having 1-10 carbon atoms, phenyl, cyclohexyl and benzyl groups.

6. A resin composition defined in claim 1 wherein $R_2$ and $R_4$ in formula (II) are respectively selected from the group consisting of one or more of the following: a hydrogen atom and a functional group selected from alkyl groups having 1-10 carbon atoms.

7. A resin composition defined in claim 1 wherein the modified polyolefin (B) is selected from the group consisting of polyethylene, polypropylene, polybutene, poly(4-methylpenetene-1), ethylene/propylene copolymer, ethylene/butene-1 copolymer, ethylene/propylene/1,4-hexadiene copolymer, ethylene/propylene/5-ethylidenenorbornene copolymer, ethylene/propylene/5-ethyl-2,5-norbornadiene copolymer and ethylene/propylene/dicyclopentadiene copolymer having said functional groups.

8. A resin composition defined in claim 1 wherein the polyamide (A) is that chosen from polycaproamide, polyhexamethyleneadipamide, polyhexamethylenesebacamide, polyhexamethylenedodecamide, polyundecanamide, polydodecanamide, polyhexamethyleneisophthalamide, polyhexamethyleneterephthalamide, polytrimethylhexamethyleneterephthalamide, polybis(4-aminocyclohexyl)methanedodecamide, polymetaxylyleneadipamide, polyundecamethyleneterephthalamide, polydodecamethyleneterephthalamide and their copolymers and mixtures.

* * * * *